(12) United States Patent
Gundlach

(10) Patent No.: US 6,553,099 B1
(45) Date of Patent: Apr. 22, 2003

(54) DEVICE FOR INDIRECTLY FORWARDING MESSAGES IN DATA AND/OR COMMUNICATIONS NETWORKS

(75) Inventor: Michael Gundlach, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/274,503

(22) Filed: Mar. 23, 1999

Related U.S. Application Data

(63) Continuation of application No. PCT/DE97/01876, filed on Aug. 28, 1997.

(30) Foreign Application Priority Data

Sep. 23, 1996 (DE) .......................... 196 38 970

(51) Int. Cl.⁷ .................... H04M 1/24; H04M 3/08; H04M 3/22; H04M 1/64; H04M 11/00
(52) U.S. Cl. .................... 379/35; 379/35; 379/67.1; 379/88.12; 379/88.18; 379/88.19; 379/88.23; 379/88.25
(58) Field of Search .................... 379/7, 32.01, 35, 379/67.1, 88.08, 88.12, 88.17, 88.18, 88.19, 88.2, 88.21, 88.23, 88.25, 88.26, 88.27

(56) References Cited

U.S. PATENT DOCUMENTS

| 5,471,519 A | * 11/1995 | Howe et al. ............. 379/67.1 |
| 5,530,739 A |   6/1996  | Okada et al. ............. 379/89 |
| 5,651,054 A | * 7/1997  | Dunn et al. ............. 379/67.1 |
| 5,894,504 A | * 4/1999  | Alfred et al. ............. 379/88.13 |
| 5,956,389 A | * 9/1999  | Jung ............. 379/88.12 |
| 6,021,176 A | * 2/2000  | McKendry et al. ............. 379/35 |
| 6,031,896 A | * 2/2000  | Gardell et al. ............. 379/88.17 |
| 6,310,939 B1 | * 10/2001 | Varney ............. 379/88.01 |
| 6,337,898 B1 | * 1/2002  | Gordon ............. 379/67.1 |

FOREIGN PATENT DOCUMENTS

| DE | 4419040 C1 | 8/1995 | H04M/3/20 |
| EP | 0655851 A1 | 5/1995 | H04M/3/50 |
| EP | 0675625 A1 | 10/1995 | H04M/3/42 |
| EP | 0736993 A1 | 10/1996 | H04M/3/20 |

\* cited by examiner

Primary Examiner—Binh Tieu
(74) Attorney, Agent, or Firm—Laurence A. Greenberg; Werner H. Stemer; Ralph E. Locher

(57) ABSTRACT

In order to satisfy the legal requirements which are made of the monitoring of telecommunications traffic, means for storing monitoring data (subscribers to be monitored, monitoring users, etc.) and for transmitting messages and indications to the users (police, information services, etc.) are provided in store-and-forward systems. The transmission of these messages and indications is also triggered, inter alia, by access operations to messages to be monitored or by access operations to messages which are addressed to subscribers that are to be monitored.

10 Claims, 5 Drawing Sheets

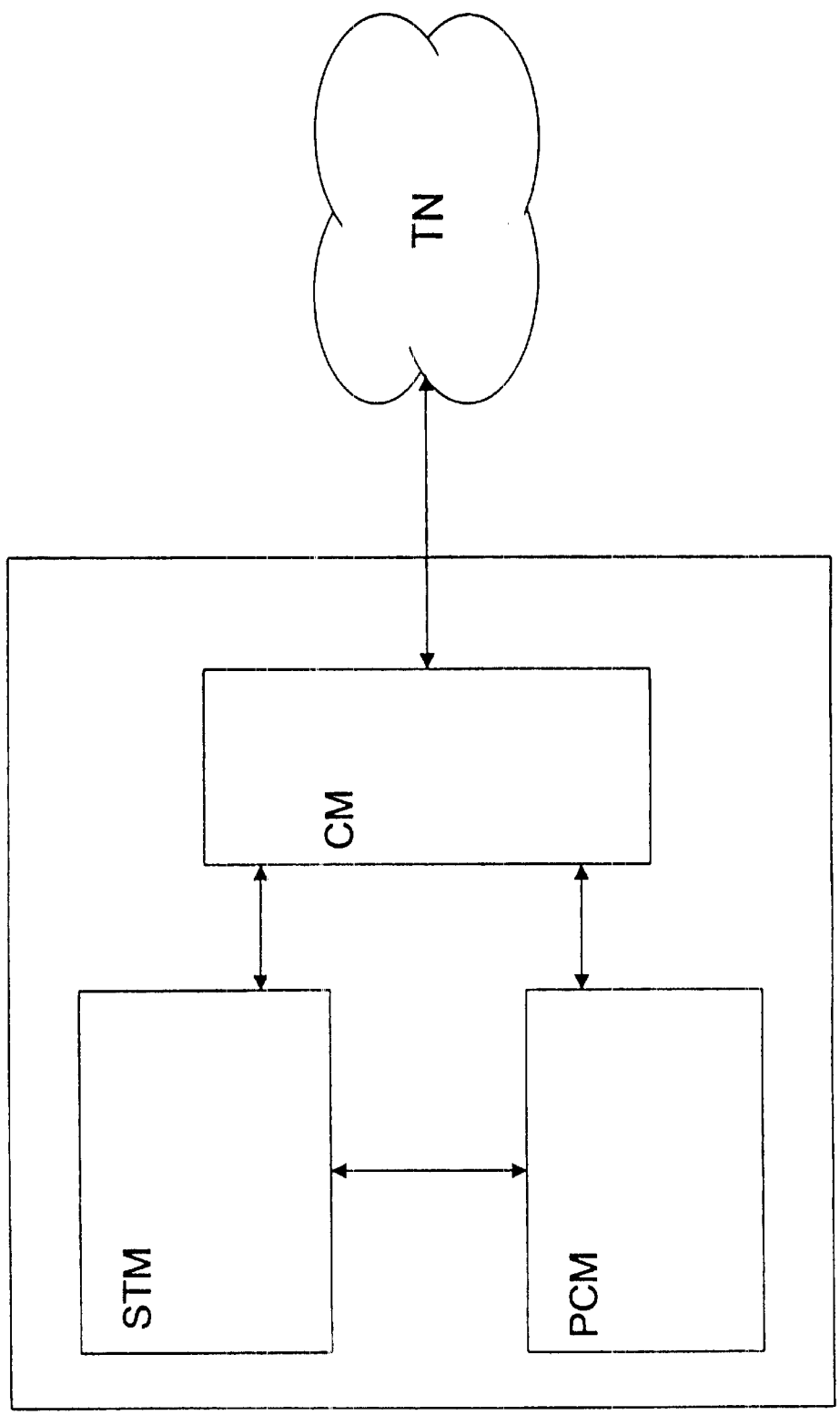

DEVICE FOR INDIRECTLY FORWARDING MESSAGES IN DATA AND/OR COMMUNICATIONS NETWORKS

CROSS-REFERENCE TO RELATED APPLICATION

This is a continuation of copending International Application PCT/DE97/01876, filed Aug. 28, 1997, which designated the United States.

BACKGROUND OF THE INVENTION

Field of the Invention

The invention relates to telecommunications. Specifically, the invention pertains to a device for indirectly forwarding messages in communications networks, i.e., in data and/or communications networks.

National and international laws demand that operators of a public network (and in future this is expected also to apply to private networks) take technical measures to permit the telecommunications traffic to be monitored by so-called users (police, information services, etc.) within the legally provided framework. In classic telephone services in landline networks, this can be done relatively easily in the local switching office of the subscriber to be monitored by marking the appropriate subscriber data record and setting up a type of conferencing circuit for the monitoring user.

For store-and-forward systems, for example voice mail, there is an additional specific requirement: both when writing to or recording messages in the (voice) mailbox and when retrieving or intercepting messages, it should be ensured that monitoring can be carried out by the users. This relates both to the case in which the subscriber to be monitored uses the store and forward system and the case in which the other party with which he is communicating (which does not necessarily have to be a subscriber to be monitored) uses such a system. In addition to the actual message which is forwarded (indirectly) using the store-and-forward system, the intention is that access data will also be determined and transmitted or signaled to the user.

SUMMARY OF THE INVENTION

It is accordingly an object of the invention to provide a device for indirectly transmitting messages in data and/or communications networks, which overcomes the above-mentioned disadvantages of the heretofore-known devices and methods of this general type and which provides a technical Leaching with which the legal requirements can also be fulfilled in the context of store-and-forward systems.

With the foregoing and other objects in view there is provided, in accordance with the invention, a device for indirectly forwarding messages in data and/or communications networks, comprising:

means for storing messages and receiver names or addresses;

means for checking an identification of a subscriber accessing the device;

means for storing information indicating whether a subscriber is to be monitored and, if appropriate, by what monitoring user the subscriber is to be monitored; and means permitting a message addressed to a given subscriber marked as a subscriber to be monitored to be transmitted to a monitoring user stored for the given subscriber.

In accordance with an added feature of the invention, there are provided:

means for storing information indicating whether a stored message is to be monitored, and if appropriate by which monitoring user;

means for transmitting an indication relating to an access to a given message, marked as a message to be monitored, to a monitoring user stored for the given message.

In accordance with another feature of the invention, means are provided for transmitting an indication to a monitoring user stored for a first subscriber, as soon as a second subscriber accesses a message stored in the device and addressed to the first subscriber, if the first subscriber is marked to be monitored.

In accordance with a concomitant feature of the invention, the indications transmitted to a monitoring user contain information selected from the group consisting of a sender of the given message, receivers of the given message, a time of access to the given message, and a method of access to the given message triggering the indication to be transmitted.

In alternative terminology, there is provided in accordance with the invention, a communications device for indirectly forwarding messages in data and/or communications networks, comprising: a communications processor; a memory device connected to said communications processor for storing messages and receiver identification; said communications processor being programmed to: check an identification of a subscriber accessing the device; store information indicating whether a subscriber is to be monitored and, if appropriate, by what monitoring user the subscriber is to be monitored; and permit a message addressed to a given subscriber marked as a subscriber to be monitored to be transmitted to a monitoring user stored for the given subscriber.

According to the present invention, means for storing monitoring data (subscribers to be monitored, monitoring users, etc.) and for transmitting messages and indications to the users (police, information services, etc.) are provided in store and forward systems. The transmission of these messages and indications is also triggered, inter alia, by access operations to the messages to be monitored or by access operations to messages which are addressed to the subscriber to be monitored.

The store-and-forward system may be implemented here, for example, within an intelligent network or else as a service node or by means of other components in a data or communications network. The communications network may support voice and/or data. The mailbox need not be assigned to a specific terminal ("virtual telephony").

Mailboxes or devices which are equivalent thereto are known in principle to those of skill in the pertinent art in a large number of widely varying types and designs. Data and/or communications networks are to be understood here basically as being all transmission devices which are suitable for transmitting messages with the involvement of a mailbox. For the invention it is in fact entirely irrelevant what the contents of the transmitted messages are. The mailbox may therefore be a voice mailbox, a data mailbox or any other device for indirectly transmitting messages. The only important factor is that the messages in the mailbox are stored together with the names and/or addresses of the receivers of these messages (cf. FIG. 4). Means for storing (STM) messages and/or receiver names or receiver addresses are known to the person skilled in the art in a large number of widely varying types and designs (cf. FIG. 5). The formulation "together with" is intended to mean here that the operating system (operating software and hardware, PCM) or a mailbox device which is equivalent thereto should be capable at any time of determining the receiver or receivers (Rec(Mail)) of a message (Mail) which are defined by the sender (Send(Mail)), and that the operating system of the mailbox should also be capable at any time of finding, for any desired predefined receiver name (Subscr) or for any desired predefined receiver address, all the messages (Pointer(Mail(Subscr))) which (possibly amongst others) are addressed to this receiver. In this context it may quite easily be the case that individual messages, or even all the messages, are public, that is to say are intended to be received by any subscriber. Such public messages could be stored in the mailbox either without naming a receiver or with a corresponding marking.

In addition, means (PCM) are provided for checking the name and/or the address of a subscriber which accesses the device. Such means, generally suitable software modules which run on suitable processors (PCM), are known to those of skill in the art in a large number of widely varying types and designs. The intention here is that initially only the identity of accessing subscribers will be determined. In a preferred embodiment of the present invention, the intention is that it will also be possible to perform surveillance of access operations of different types, that is to say interception, deletion, modification, downloading, etc., for example, as a function of the respective access rights of the accessing subscribers.

In addition, the invention provides means for storing information which indicates whether a subscriber is to be monitored and, if appropriate, by which monitoring user this subscriber is to be monitored. These means may be implemented, for example, by means of a table which is stored on a suitable storage medium and in which a subscriber which is to be monitored is appropriately marked. In addition, this table may, if appropriate, also contain, for example, a reference to a storage address at which the monitoring users by which this subscriber is to be monitored are stored.

Finally, the present invention provides means which permit a message which is addressed to a subscriber which is marked as a subscriber which is to be monitored to be transmitted (CM) to a monitoring user which is stored for this subscriber. These means can most easily be implemented by appropriate software which examines each message arriving in the mailbox to determine whether this message is addressed to a subscriber which is marked as a subscriber which is to monitored, and which performs a transmission of this message in the case of a positive result of this check to a monitoring user stored for this subscriber, or to a plurality of monitoring users stored for this subscriber. The aforesaid check may simply be carried out by means of an appropriate search in a subscriber table for all the addressees listed in the address field of the message.

According to one advantageous development of the invention, means are provided for storing information which indicates whether a stored message is to be monitored, and if appropriate by which monitoring user, and means which permit an indication relating to an access operation to a message which is marked as a message to be monitored to be transmitted to a monitoring user which is stored for this message. These measures may be implemented, for example, by means of a table in which a message which is to be monitored is marked as such and which contains a reference to a storage address at which the monitoring user or users of a message is/are stored. If such a message is accessed, an appropriate indication is transmitted to the monitoring user or users. This is carried out most easily by using software provided for this purpose.

According to a further advantageous development of the invention, means are provided for transmitting an indication to a monitoring user which is stored for a first subscriber as soon as a second subscriber accesses a message which is stored in the device and which is addressed to the first subscriber if the latter is marked as a subscriber which is to be monitored.

A further advantageous development of the invention provides for a device of the type which has already been described, in which the indications which are transmitted to a monitoring user contain information relating to the sender and/or the receiver of a message and/or the time and/or the method of the access operation, triggering the transmission of the indication, to this message.

Other features which are considered as characteristic for the invention are set forth in the appended claims.

In order to explain the invention in more detail with reference to case examples, for the sake of better comprehension a voice mailbox will be considered below. However, the invention also applies correspondingly to other types of mailboxes and in networks other than the telephone network. In particular, the association of the (voice) mailbox to a transit switching office, as represented in the figures, is to be considered only as an example.

Although the invention is illustrated and described herein as embodied in a device for indirectly forwarding messages in data and/or communications networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a schematic block view of the most important architecture features of a mailbox according to the invention.

DESCRIPTION OF THE PREFERRED EMBODIMENTS

Figure 1:
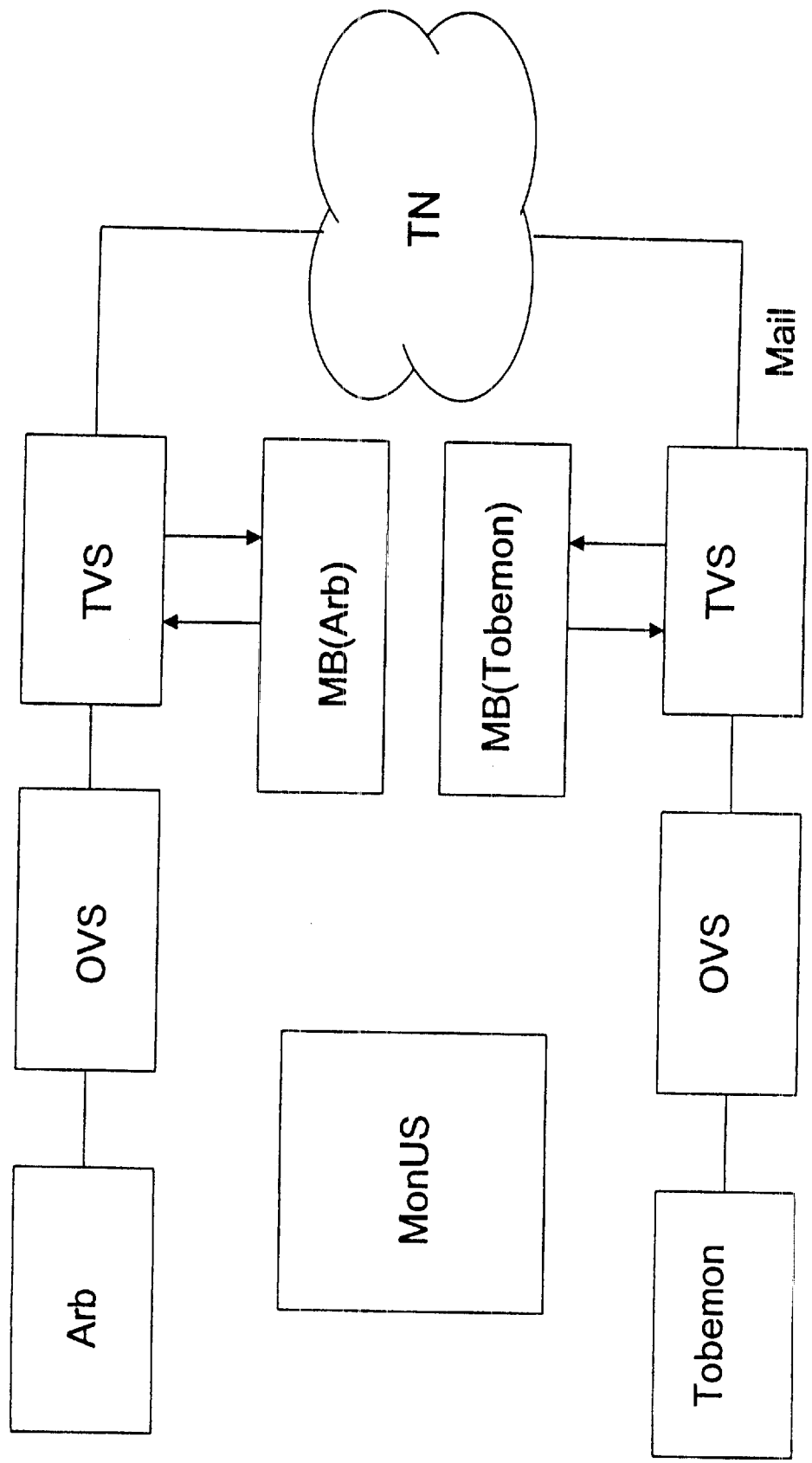
FIG. 1 is a schematic block view of a typical scenario of the indirect forwarding of messages in communications networks.

Referring now to the figures of the drawing in detail and first, particularly, to FIG. 1 thereof, there is illustrated the general concept on which the invention is based. A data and/or communications network (transit network, TN) serves to transmit messages between subscribers, amongst which there are subscribers which are to be monitored (Tobemon) and subscribers which are not to be monitored (arbitrary, Arb). At least one subscriber has a mailbox, i.e. is the registered user of a mailbox. Since each mailbox can have a plurality of registered users (and generally does so) it is quite possible that two communicating subscribers will use the same mailbox in the physical sense even if their mailboxes are logically of course different (different subscriber data records, often referred to as user accounts).

Figure 2:
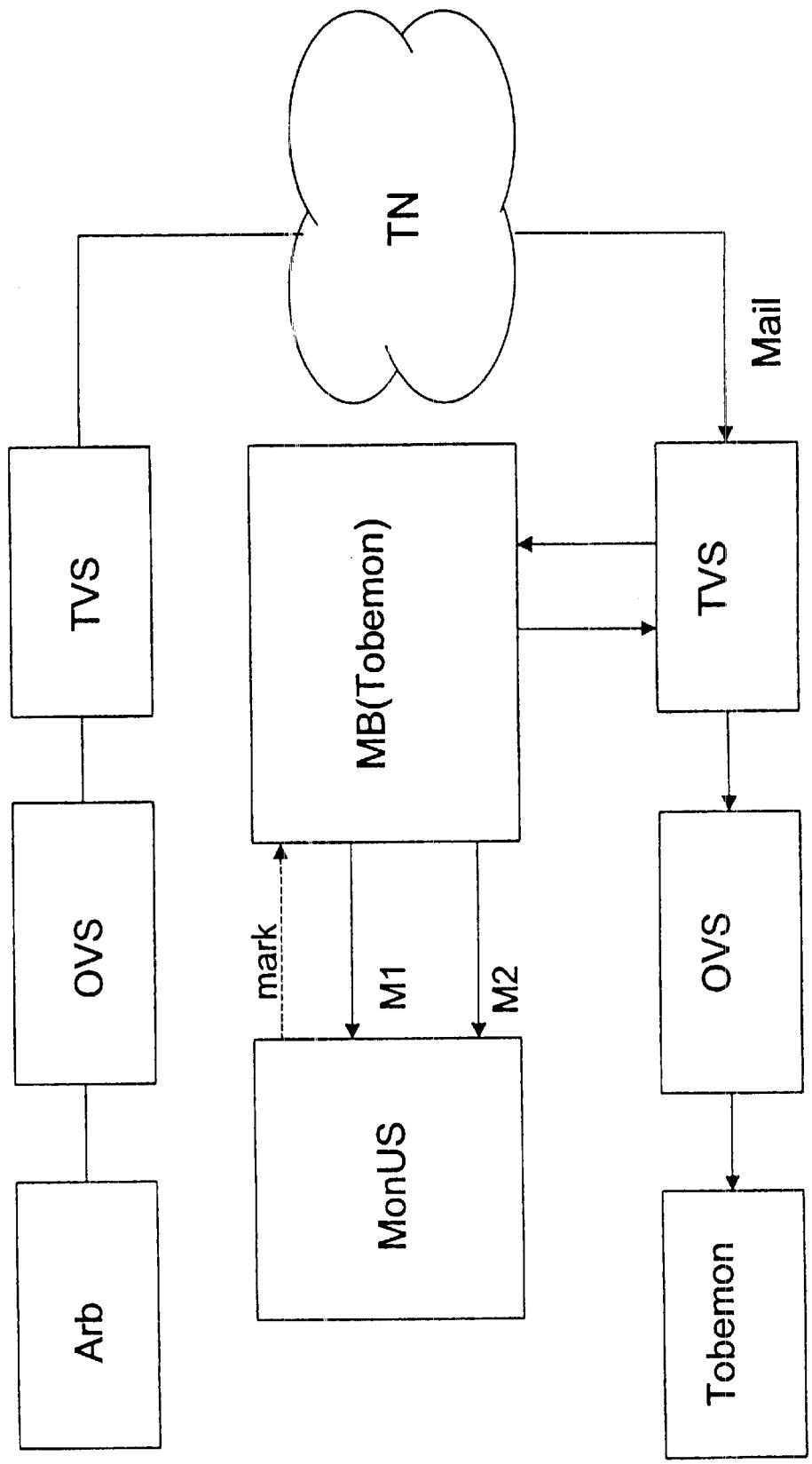
FIG. 2 is a similar view of a typical scenario in which the mailbox of a subscriber to be monitored is called up.

Initially, an application will be considered in which the subscriber to be monitored (Tobemon) is the registered user of a voice mailbox (MB(Tobemon)) and receives an indirectly forwarded call (Mail, i.e. in this case a voice mail) from an arbitrary subscriber (Arb) (i.e. a subscriber who/which does not necessarily need to be monitored). This case is clarified by the schematic illustration in FIG. 2.

At the request of a monitoring user (Monus), the call number, the identity or generally the subscriber data record of the Tobemon is marked. This is usually carried out with the involvement of a service provider by entering an appropriate note in the subscriber data record of the Tobemon. The marking may contain information which indicates which data (for example only time of day, duration and source of calls with or without contents) are to be transmitted to which user or users within which time period. Calls to the mailbox of the subscriber to be monitored are forwarded (M1) (preferably immediately) on line (depending on the information in the marking) to the user or users. If a message is read (or intercepted), the time, the duration, the location and the method of access is forwarded (M2) to the user or users.

Figure 3:
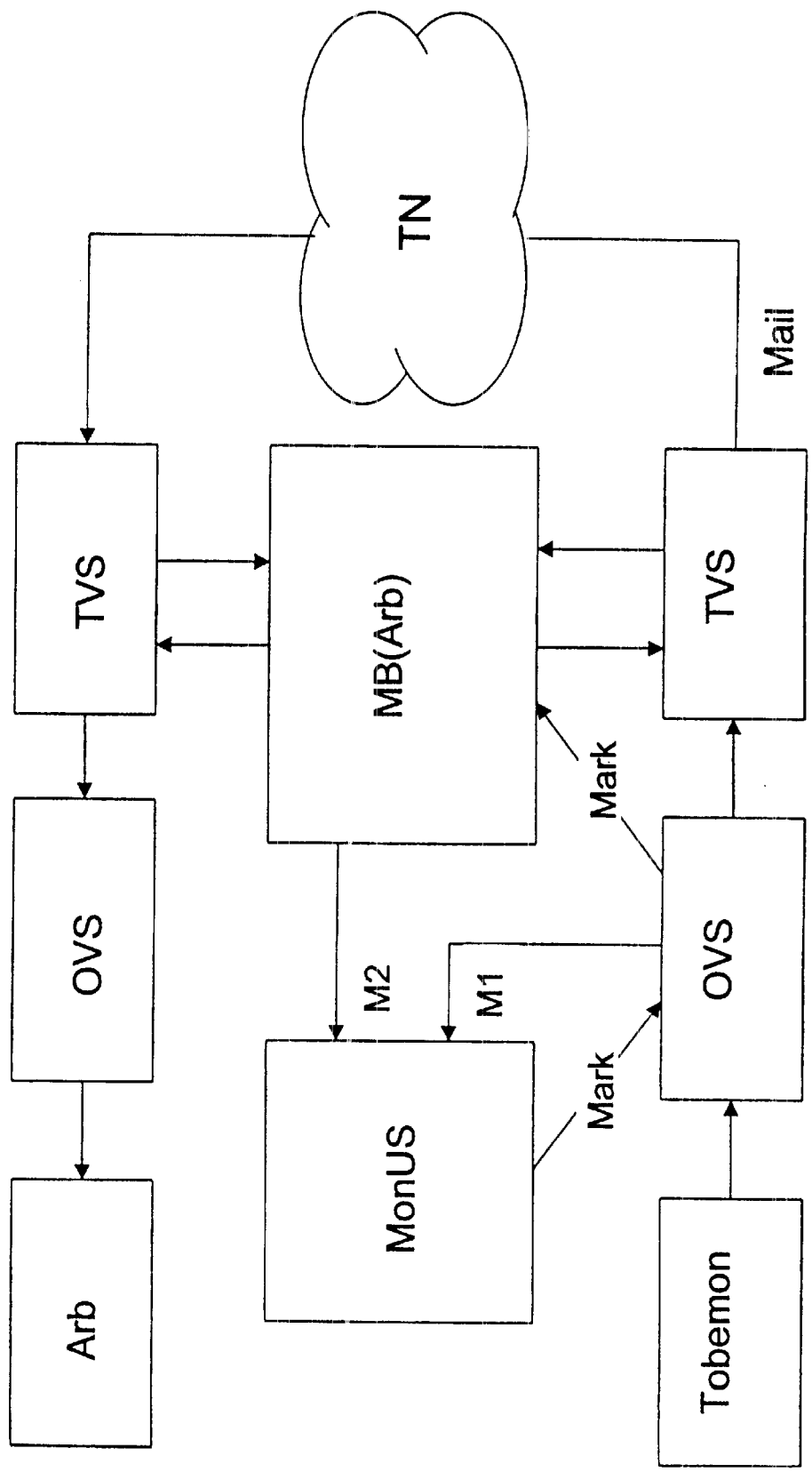
FIG. 3 is a similar view of a typical scenario in which a subscriber to be monitored calls up a mailbox.
Figure 4:
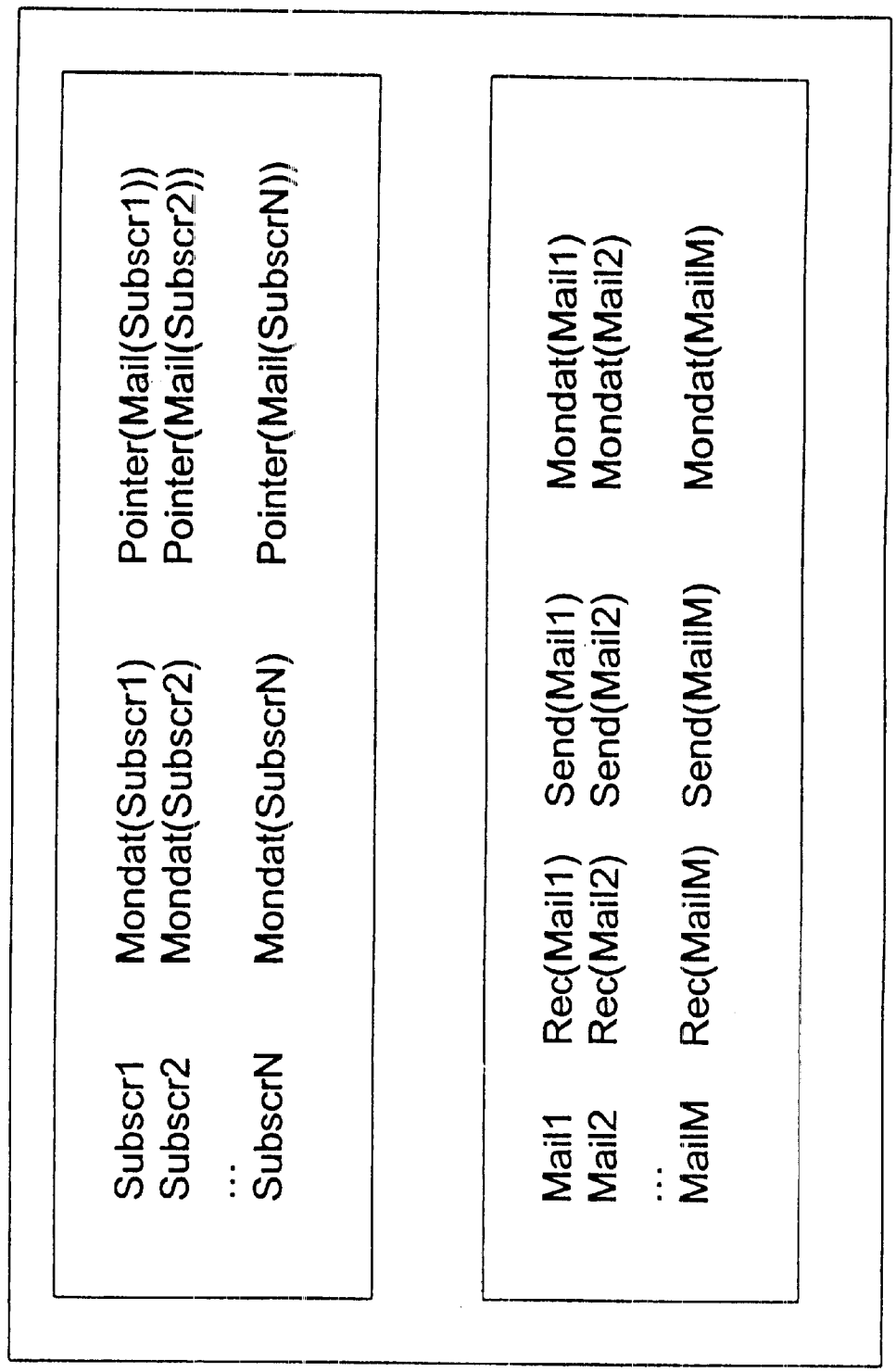
FIG. 4 is a block view of the typical data structures in a mailbox according to a preferred embodiment of the invention.

In a second application, which is illustrated in FIG. 3, a subscriber which is to be monitored (Tobemon) calls up the mailbox (MB(Arb)) of another arbitrary subscriber (Arb). In this case, the call number of the subscriber which is to be monitored is marked in his local system (i.e. for example in his local switching office OVS if he is a normal telephone subscriber). The marking may contain information which indicates which data is to be transmitted in which time period to which user or users. The local switching office, or generally the system in which the subscriber to be monitored (Tobemon) is marked detects that the data is a store and forward mail. This is carried out, for example, with reference to the selected call number (generally the address of the message) or with reference to an item of characteristic signaling information of the selected mailbox. This information may be requested if appropriate.

The local switching office (generally the system) of the subscriber which is to be monitored marks the mail (which cannot be seen by third parties) including information indicating the monitoring user and, if appropriate, further information, depending on the marking in the system (OVS). At the same time, the message is forwarded to the monitoring user depending on the marking in the system. If the message is read by the actual receiver (i.e. by the arbitrary subscriber to which it was actually addressed) an indication with information indicating the time, duration, location and method of access is forwarded to the monitoring user. Messages in the mailbox. of the receiver which do not originate from transmitters which are to monitored or messages which are not marked as messages to be monitored cannot be seen by the monitoring user.

In order to carry out these processes it is necessary to have a mailbox which supports the aforesaid processes in a suitable way. Accordingly, a marking, which indicates whether a subscriber is to be monitored and by whom (Mondat(Subscr)) and whether received mail (Mondat(Mail)) is to be monitored and by whom must be stored and administered (i.e. information handling procedures must be carried out on it using appropriate software, for example). For example, a data structure, which provides for each registered user (Subscr1, . . . , SubscrN) a data record in a collection of data records, is suitable for this, the data (Mondat(Subscr)) of the corresponding subscriber which relates to the monitoring operation and a reference (Pointer (Mail(Subscr))) which makes it possible to access the messages in whose address fields this subscriber is named as a receiver (Rec(Mail)) or sender Send(Mail)) being stored in each data record. In addition, it is useful to have a further collection of data records in which in the mail (Mail1, . . . , MailM) stored in the mailbox, a data record in which the receivers (Rec(Mail)), the senders (Send(Mail)) and the monitoring data (Mondat(Mail)) of the corresponding mail are stored.

The operating software of the mailbox administers and updates the aforesaid collections of data records. It also initiates the processes for transmitting mail which has been transmitted to a monitored subscriber, if appropriate incl. time, duration and source, to the monitoring user or users, in accordance with the corresponding monitoring data fields (Mondat);

the time, location and method of access to the mailbox of a subscriber which is to be monitored (i.e. for example to a message stored for it in a mailbox in which a plurality of users are registered); and the time, method and location of access to a mail which is marked (for example by entry in Mondat(Mail)) in the mailbox of an arbitrary subscriber to the user or users.

In order to permit arbitrary messages of a subscriber which is to be monitored to any other subscribers to be monitored by means of their mailbox, the local system in which the subscriber which is to be monitored is registered, that is to say for example its local switching office must have devices which permit, the subscriber which is to be monitored to be correspondingly marked as "to be monitored;"

communications data and connection data which is associated with its message traffic to be forwarded to one or more users;

information which indicates the type of the destination of communications data to be requested and evaluated, in particular in respect of whether the destination is a mailbox; and a mail which is to be monitored to be marked, and the marking to be transmitted to the destination mailbox.

For a better understanding of the description, the following is a list of abbreviations used in the description of the present invention:

STM storage means
PCM processor, means for information processing, software and hardware
CM means for information transmission
TN Transit network, data and/or communications network
Subscr Subscriber name, subscriber identity, subscriber number, subscriber address, user account name
Mondat Data field in a data record which is used to store monitoring markings and other monitoring-related data
Rec Receiver address
Send Sender address
Pointer Reference to a storage address or to a number of storage addresses
Arb Any arbitrary subscriber
OVS A local system in which a subscriber is registered, for example a local switching office
TVS Transit switching office
MB Mailbox
MonUS Monitoring user Tobemon Subscriber to be monitored M1, M2 Announcements or messages which are transmitted to MonUSs mark Marking of a message

I claim:

1. A device for indirectly forwarding messages in data and/or communications networks, comprising:
   means for storing messages and receiver identification;
   means for checking an identification of a subscriber accessing the device;
   means for storing information indicating whether a subscriber is to be monitored and, if appropriate, by what monitoring user the subscriber is to be monitored; and
   means permitting a message addressed to a given subscriber marked as a subscriber to be monitored to be transmitted to a monitoring user stored for the given subscriber.

2. The device according to claim 1, wherein the receiver identification is selected from the group consisting of receiver names and receiver addresses.

3. The device according to claim 1, which further comprises:
   means for storing information indicating whether a stored message is to be monitored, and if appropriate by which monitoring user;
   means for transmitting an indication relating to an access to a given message, marked as a message to be monitored, to a monitoring user stored for the given message.

4. The device according to claim 1, which further comprises means for transmitting an indication to a monitoring user stored for a first subscriber, as soon as a second subscriber accesses a message stored in the device and addressed to the first subscriber, if the first subscriber is marked to be monitored.

5. The device according to claim 3, wherein the indications transmitted to a monitoring user contain information selected from the group consisting of a sender of the given message, receivers of the given message, a time of access to the given message, and a method of access to the given message triggering the indication to be transmitted.

6. A communications device for indirectly forwarding messages in data and/or communications networks, comprising:
   a communications processor;
   a memory device connected to said communications processor for storing messages and receiver identification;
   said communications processor being programmed to:
      check an identification of a subscriber accessing the device;
      store information indicating whether a subscriber is to be monitored and, if appropriate, by what monitoring user the subscriber is to be monitored; and
      permit a message addressed to a given subscriber marked as a subscriber to be monitored to be transmitted to a monitoring user stored for the given subscriber.

7. The device according to claim 6, wherein the receiver identification is selected from the group consisting of receiver names and receiver addresses.

8. The device according to claim 6, wherein said communications processor is further programmed to:
   store information indicating whether a stored message is to be monitored, and if appropriate by which monitoring user;
   transmit an indication relating to an access to a given message, marked as a message to be monitored, to a monitoring user stored for the given message.

9. The device according to claim 6, wherein said communications processor is further programmed to transmit an indication to a monitoring user stored for a first subscriber, as soon as a second subscriber accesses a message stored in the device and addressed to the first subscriber, if the first subscriber is marked to be monitored.

10. The device according to claim 8, wherein the indications transmitted to a monitoring user contain information selected from the group consisting of a sender of the given message, receivers of the given message, a time of access to the given message, and a method of access to the given message triggering the indication to be transmitted.

* * * * *